UNITED STATES PATENT OFFICE.

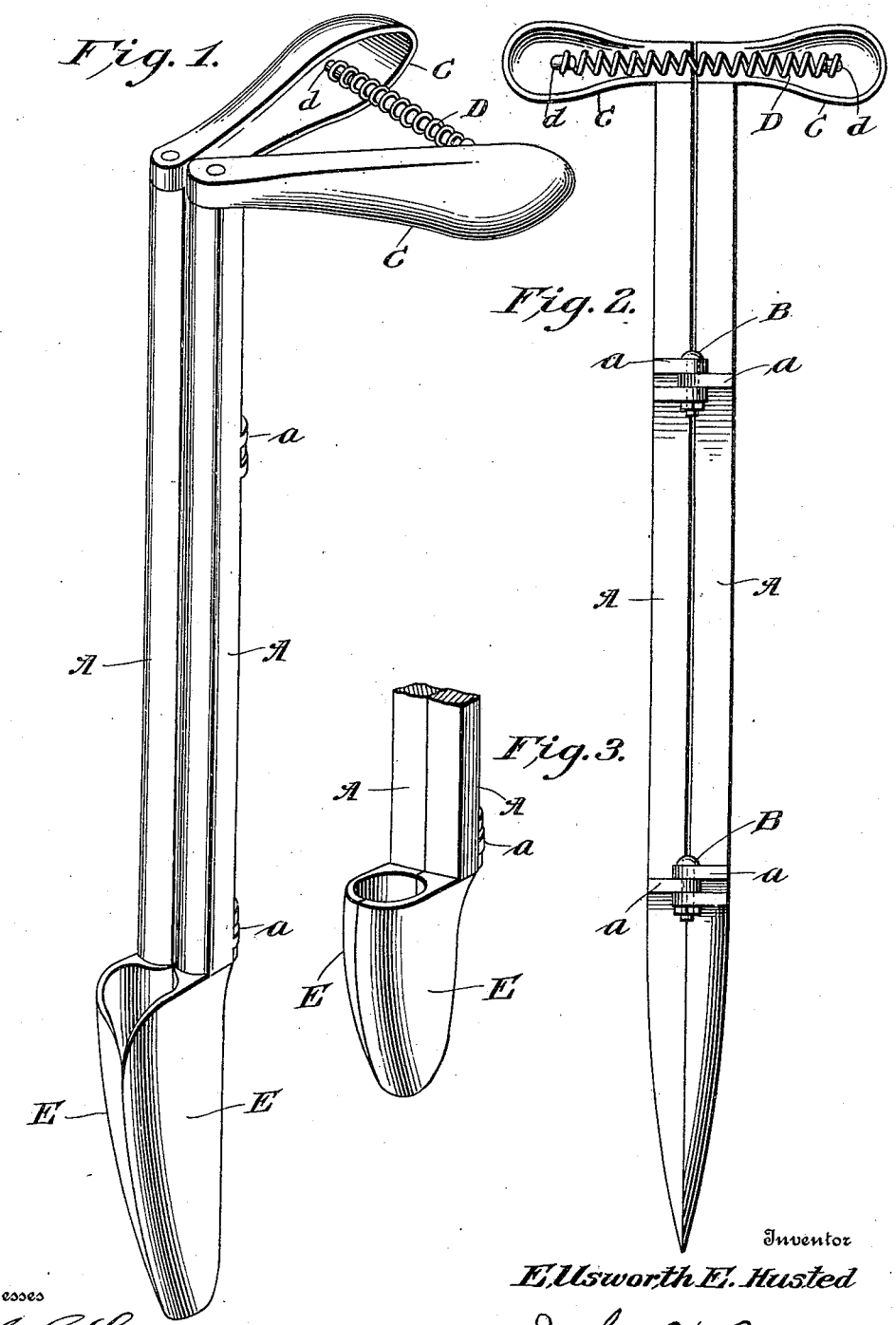

ELLSWORTH E. HUSTED, OF NEWPORT, NEW JERSEY.

TRANSPLANTER.

No. 921,993.  Specification of Letters Patent.  Patented May 18, 1909.

Application filed June 30, 1908. Serial No. 441,169.

*To all whom it may concern:*

Be it known that I, ELLSWORTH E. HUSTED, a citizen of the United States, residing at Newport, in the county of Cumberland and State of New Jersey, have invented certain new and useful Improvements in Transplanters, of which the following is a specification.

My invention relates to gardening implements particularly devised for transplanting plants where great care has to be exercised in the handling thereof.

The object of my invention is to provide a transplanter which has a movement around the axial center of the plant, and thus does not require to be inserted over the plant, but may instead be inserted at one side and then closed around the roots of the plant. This is of great advantage where delicate plants are to be handled as the implement in closing will not contact with or bruise the plant.

My invention consists in a transplanter in which two approximately semi-circular blades work on a common vertical axis which is at one side of the axial centers of the blades themselves, and in details of construction as will be hereinafter described and definitely stated in the claims.

In the drawings, Figure 1, is a perspective view of my transplanter. Fig. 2, is a rear elevation thereof, and Fig. 3, is a perspective view of the lower end of my implement showing a modified form of blade.

In the drawings A—A designate two vertical parallel bars having ears a on the rear faces thereof pivoted to each other by the pintle bolts B. At their upper ends there are provided handles C—C which when brought together complete a body having a form easily grasped by the hand. The handles are preferably hollow and support between them the compressible spring D, the ends of the spring engaging with studs d. The spring D normally holds the handles at an angle to each other as shown in Fig. 1. At their lower ends the rods A are each formed with a tapered elongated forwardly projecting blade E approximately semi-circular in section. The two blades when their forward edges are in contact with each other assume the position shown in Fig. 1, and complete an approximate cylinder.

It will be observed that upon closing the handle C—C the bars A will be turned upon the pintles B and the blades E opened so that they project laterally.

In Fig. 1, I show a transplanter for ordinary garden flowers, wherein the upper end of the blade is rounded along its edge and the blades when closed only approximately form a circle. This form of blade is adapted to hold a plant relatively loosely, but in Fig. 3, I show a transplanter used for onions or other plants requiring that the earth shall be held compactly around the base of the plant in which the blades are very close to being an exact semi-circle.

It will be seen that inasmuch as the blades project forward from the bars, the space above the bars is entirely free so that the upper portion of the plant is not likely to be bruised by contact with the bars as would be the case were such small blades attached to the sides of horizontally pivoted bars. Forcing the transplanter into the ground with its blades open is much easier than driving opposed blades down on either side of the plant, and there is much less danger of cutting the plant roots. Another advantage resides in the fact that my transplanter may be manipulated with one hand, while with the other the plant may be supported and properly set out. This is rendered possible by the handles being so set that they may be easily grasped by one hand and operated. Another advantage in my device is that the bars A may be as long or short as desired, and yet the device occupy no more lateral space than it would if the bars A were short.

Having thus described my invention what I claim as new and desire to secure by Letters Patent is:

1. A transplanting implement having two parallel bars, a plurality of pivotal connections between said bars, handles on said bars at one end located at an angle to each other, and blades on the other ends of said bars.

2. A transplanting implement having two parallel bars, a plurality of pivotal connections between said bars, handles at the upper ends of the bars, said bars being each provided with tapering semi-circular blades projecting out at one side of said bars having edges adapted to contact with each other.

3. A transplanting implement having two parallel bars, a plurality of pivotal connections between said bars, handles projecting from the upper ends of said bars at an angle to each other, a spring located between said handles and acting to force them apart at their farther ends, and downwardly tapering semi-circular plates projecting out at one side of said bars having edges adapted to contact with each other 4. A transplanting implement having two parallel bars, a plurality of pivotal connections between said bars, the lower ends of said bars being each provided with downwardly extending tapering semi-circular plates projecting out at one side of said bars having edges adapted to contact with each other, the upper ends of the bars being each provided with a hollow handle open on the inside face, and a spring located between said handles and acting to force them apart at their outer ends.

In testimony whereof I have signed my name to this specification in the presence of two subscribing witnesses.

ELLSWORTH E. HUSTED.

Witnesses:
   HARRY S. LITTLE,
   CHAS. E. GASKILL.